United States Patent

Ito et al.

[11] Patent Number: 5,823,499
[45] Date of Patent: Oct. 20, 1998

[54] DRIVE APPARATUS WITH A RESILIENT COUPLING FOR A POWER SEAT

[75] Inventors: Sadao Ito, Anjyo; Haruo Kato, Kariya, both of Japan

[73] Assignee: Aisin Seiki Kabushiki Kaisha, Kariya, Japan

[21] Appl. No.: 706,146

[22] Filed: Sep. 20, 1996

[30] Foreign Application Priority Data

Sep. 22, 1995 [JP] Japan .................................. 7-244671

[51] Int. Cl.⁶ .................. B60N 2/06; F16C 1/08
[52] U.S. Cl. ............ 248/429; 296/65.15; 403/357; 74/89.14; 74/89.15; 464/57; 464/97; 464/160; 464/179
[58] Field of Search ............ 248/429, 430, 248/424, 421, 422; 296/65.15; 74/89.14, 89.15; 464/51, 57, 78, 97, 106, 155, 160, 179, 182; 403/357, 356, 355, 376

[56] References Cited

U.S. PATENT DOCUMENTS

| 1,871,528 | 8/1932 | Joline ................................ 464/57 X |
| 2,892,646 | 6/1959 | Doble ................................ 464/106 X |
| 2,968,504 | 1/1961 | Hansen ................................ 403/357 |
| 3,130,990 | 4/1964 | Leitmann ............................ 403/357 |
| 3,558,165 | 1/1971 | Lundergan .......................... 403/357 |
| 4,541,160 | 9/1985 | Roberts ............................ 464/182 X |
| 4,915,340 | 4/1990 | Nawa et al. ......................... 248/429 |
| 5,144,849 | 9/1992 | Aihara et al. ....................... 74/89.14 |

FOREIGN PATENT DOCUMENTS

| 86-160629 | 7/1986 | Japan . |
| 88-193123 | 12/1988 | Japan . |
| 92-22328 | 2/1992 | Japan . |
| 93-12256 | 2/1993 | Japan . |

Primary Examiner—Leslie A. Braun
Assistant Examiner—Stephen S. Wentsler
Attorney, Agent, or Firm—Sughrue, Mion, Zinn, Macpeak & Seas, PLLC

[57] ABSTRACT

A drive apparatus includes an electric motor, a speed reducer and a coupling member located between the motor and the speed reducer. The output shaft of the motor and the input shaft of the speed reducer are provided with longitudinally extending grooves having a square or rectangular cross section in which barrel members having the mating cross section are inserted, respectively to absorb any gap therebetween. The box like barrel member has four segments which are brought into resilient contact with the groove.

5 Claims, 4 Drawing Sheets

DRIVE APPARATUS WITH A RESILIENT COUPLING FOR A POWER SEAT

BACKGROUND OF THE INVENTION

This invention relates to a drive apparatus and more particularly to a drive apparatus adapted to be used in a power seat for an automotive vehicle.

A drive apparatus having an electric motor, a speed reducer or reduction gear means connected to the motor via a resilient coupling member, and a driven member receiving rotational torque from the motor to be displaced finds wide use in a variety of automotive vehicle and electrical devices. An example of the conventional drive apparatus is disclosed in Japanese Utility Model Laid-open Publication (KOKAI) No. Hei 4-22328 (1992) in which a motor for moving a seat forwardly and rearwardly along a rail, a speed reducer or reduction gear means transmitting amplified rotational torque to the seat, and a resilient torque cable an output shaft of the motor to an input shaft of the reduction gear means are introduced as components of the drive apparatus. In this prior case, the reduction gear means has an input shaft, the distal end of which is provided with a groove having a rectangular cross section (refer to as a rectangular groove) and the motor has an output shaft, the distal end of which is provided with a rectangular groove. The resilient torque cable is provided at its both ends with rectangularly deformed or crushed shaft portions which are inserted into the corresponding rectangular grooves, so that the output shaft of the motor is coupled to the input shaft of the speed reducer via the torque cable and any misalignment between both the shafts can be absorbed thereby to efficiently transmit rotational torque from the motor to the driven member.

However, it has been recognized that there are some manufacturing or assembling tolerances in each shaft portion of the torque cable and the grooves formed in the input shaft of the speed reducer and the output shaft of the motor when they are inserted into the grooves. As a result, respective parts can not be close enough together to come into contact along the mating parts when they are inserted into the grooves and small gap which may produce abnormal noises is provided.

SUMMARY OF THE INVENTION

Accordingly, an object of the present invention is to provide a drive apparatus which diminishes small gap which may produce noises or chatters between a coupling member and an output shaft of an electric motor and/or a coupling member and an input shaft of a coupling member.

Another object of the present invention is to provide a drive apparatus which is suitable to be used with a power seat for an automotive vehicle.

According to the present invention, the foregoing objects are attained by providing a drive apparatus, comprising: an electric motor for displacing a driven member; a reduction gear means for transmitting rotational torque from the motor to the driven member; a resilient coupling member for connecting an output shaft of the motor to an input shaft of the reduction gear means together, the input shaft being provided at its end portion with a polygonal groove which is open to an end face thereof and the output shaft being provided at its end portion with a polygonal groove which is open to an end face thereof, both polygonal end portions of the resilient coupling member being inserted in each grooves, respectively; and polygonal barrel members interposed between each ends of the coupling member and each grooves and having deformed portions.

According to further aspect of the present invention, there is provided a power seat for an automotive vehicle having improved drive means, comprising: a lower rail secured to a vehicle's floor; an upper rail slidable with respect to the lower rail; a screw shaft supported on the upper rail; a nut connected to the lower rail and engaged with the screw shaft to allow a rotation of the screw shaft; an electric motor supported on the side of the upper rail; a speed reducer connected to the screw shaft; a coupling member for connecting the motor and the speed reducer together to allow rotational torque to be transmitted from the motor to the speed reducer; and at least one barrel member having the polygonal cross section put on at least one of the end portions of the coupling member and inserted into a groove in a confronting shape formed in the input shaft of the speed reducer or the output shaft of the motor, the polygonal barrel member being made of a thin metal material and having at least one deformed portion which is deformably contacted with the end of the coupling member or the groove formed in the input shaft or the output shaft.

The invention will now be further described with reference to the accompanying drawings which illustrate, by way of example, embodiment of a drive apparatus in accordance with the invention.

DETAILED DESCRIPTION OF A PREFERRED EMBODIMENT

Figure 1:
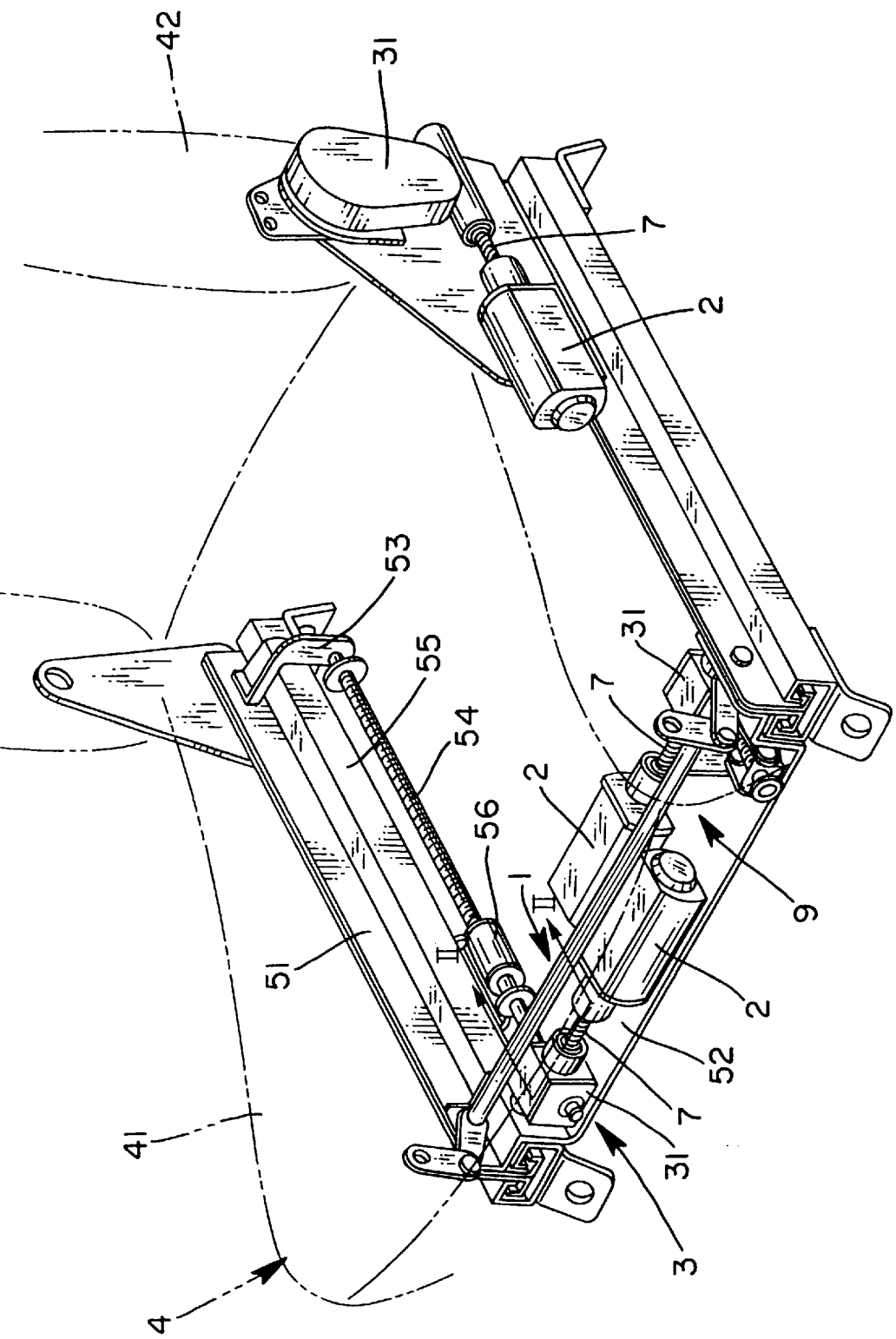
FIG. 1 is a perspective view showing a frame of a power seat wherein a drive apparatus according to the present invention is incorporated.
Figure 2:
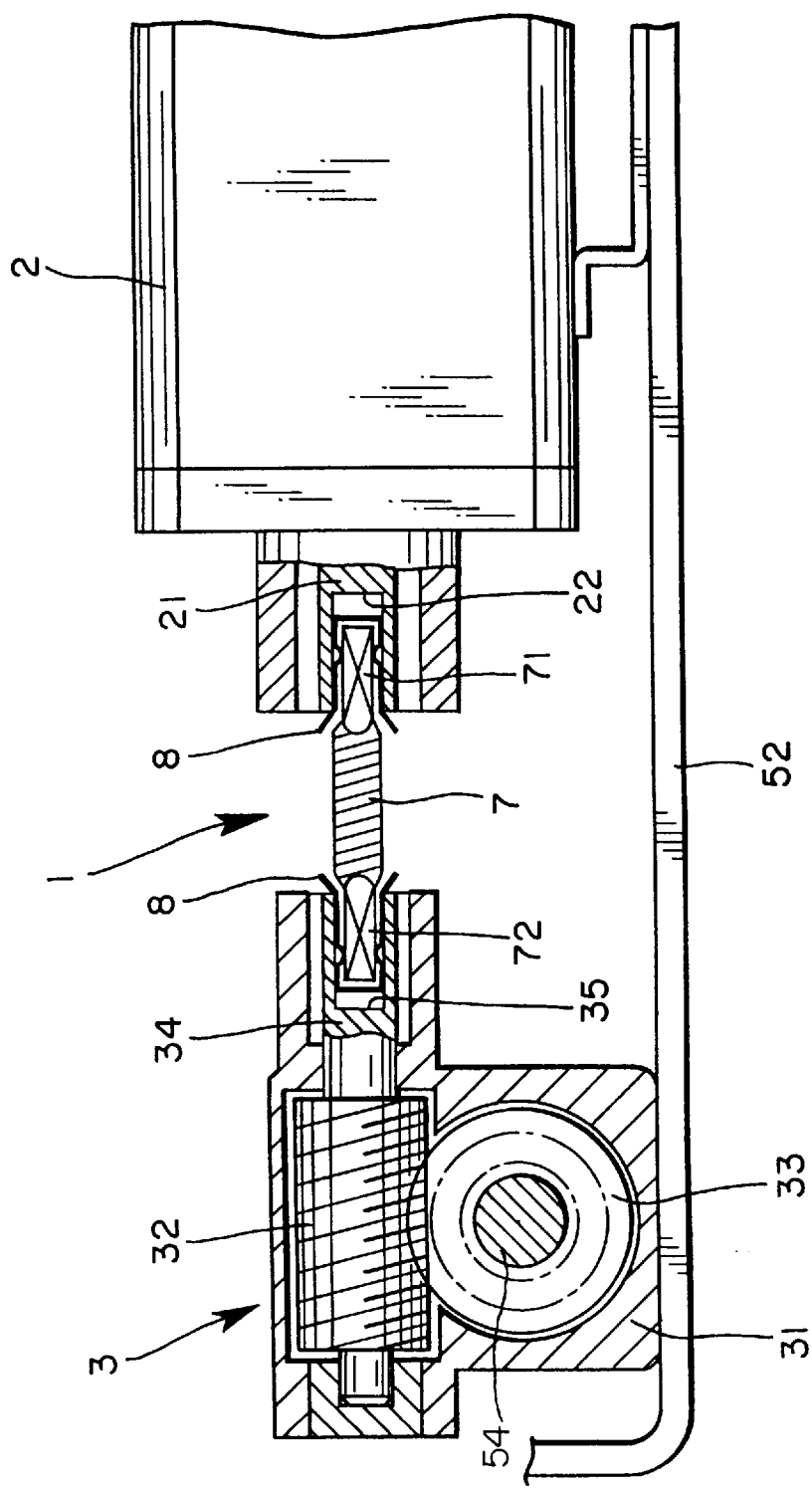
FIG. 2 is a cross sectional view taken along the line II—II in FIG. 1 showing a drive apparatus according to the present invention.

The present invention will now be described in more detail by way of a preferred embodiment thereof in connection with FIGS. 1 and 2. As shown in FIGS. 1 and 2, a power seat 4 for an automotive vehicle having an improved drive apparatus 1 includes a pair of lower rails 55 secured to a vehicle floor, a pair of upper rails 51 slidable with respect to the lower rails 55 and to which a seat cushion 41 is fastened, and a bracket 52 bridging the upper rails 51. The drive apparatus 1 has an electric motor 2 mounted on the bracket 52 and a speed reducer or reduction gear means 3 which is accommodated in a housing 31 mounted on the bracket 52. The reduction gear means 3 is composed of a worm gear 32 of which an output shaft 34 is coupled to an input shaft 21 of the motor via a resilient coupling member 7 such as a resilient torque cable and a worm wheel gear 33 meshed with the worm gear 32.

The upper rail 51 is provided with a screw shaft 54 which extends parallel with the side of the upper rail 51 and is rotatably supported on the upper rail 51 through a bracket 53. The screw shaft 54 is connected to the worm wheel gear 33 to transmit rotational torque from the motor to the screw shaft 54 and engaged with a nut member 56 which is secured to the lower rail 55.

When the motor 2 is rotated and the worm wheel gear 33 is also rotated by the motor 2, the screw shaft 54 is rotated through the worm wheel gear 33 and forced to be moved forwardly or rearwardly with respect to the lower rail 55 in accordance with the rotating direction of the motor 2 owing to the threaded engagement of the nut member 56 secured to the lower rail and the screw shaft 54 rotatably supported on the upper rail 51. When the operation of the motor 2 terminates, the seat 4 is maintained at a position determined by the afore-mentioned threaded engagement.

As shown in the drawings, the output shaft 21 of the motor 2 is coupled to the input shaft 34 of the reduction gear means 3 through the resilient torque cable 7 of which ends are deformed by a press-process to have first end portion 71 having a rectangular cross section (refer to as a rectangular shaft portion) and a second end portion 72 having a rectangular cross secion (refer to as a rectangular shaft portion). The distal end of the output shaft 21 of the motor 2 is provided with a first longitudinally extending groove 22 which has a square or rectangular cross section (refer to as a rectangular groove) and the distal end of the input shaft 34 of the worm gear 32 is provided with a second longitudinally extending groove 35 which has a square or rectangular cross section (refer to as a rectangular groove). It is noted in this example that rectangular shape portions are easily replaced by polygonal shape portions.

When the first and second rectangular shaft portions 71, 72 are inserted into the first and second rectangular grooves 22, 35, barrel members 8, 8 having a rectangular cross section (refer to as a rectangular barrel member) are interposed therebetween to absorb any misalignment of the output shaft 21 and the input shaft 34 and ensure a smooth transmission of the rotational torque from the motor 2 to the screw shaft 54.

Figure 3:
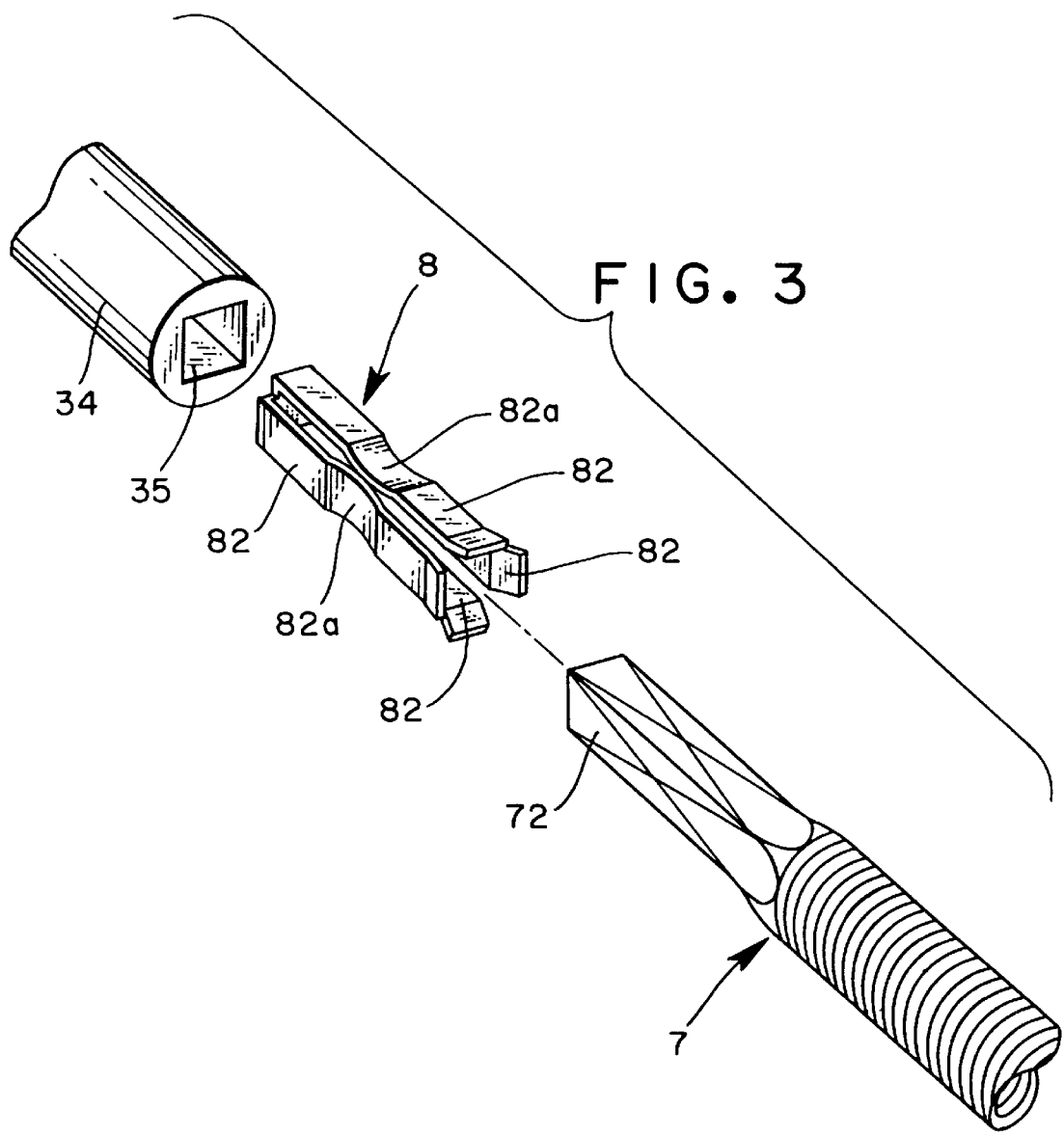
FIG. 3 is a perspective view showing a rectangular barrel member which can be used in a drive apparatus according to the present invention.
Figure 4:
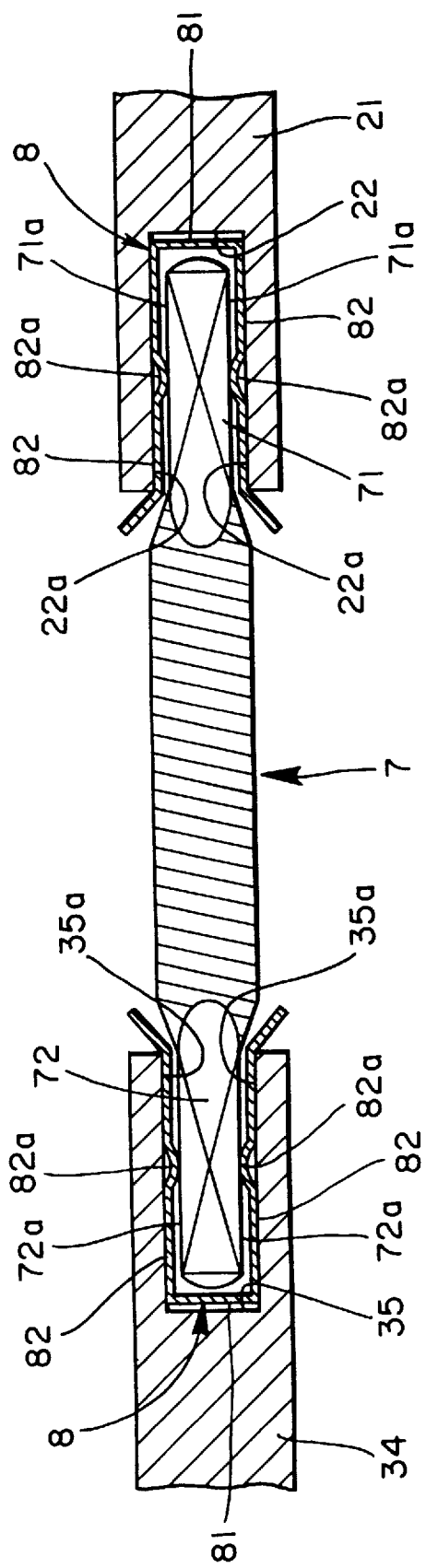
FIG. 4 is a partial enlarged cross sectional view similar to FIG. 2 showing the details of the coupling which can be used in a drive apparatus according to the present invention.
Figure 5:
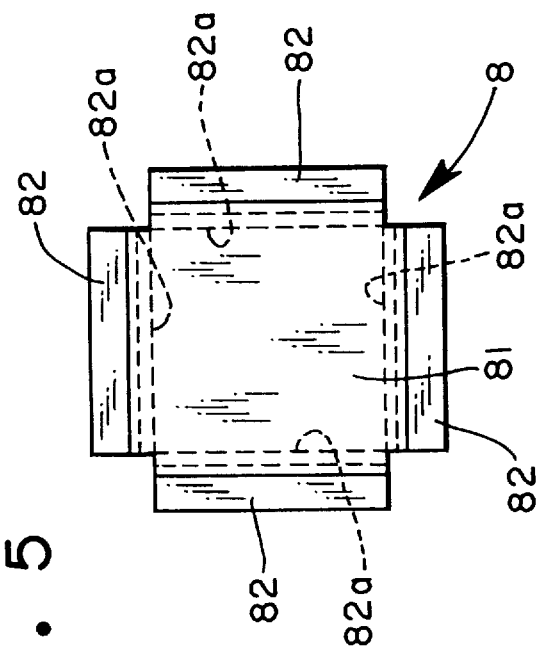
FIG. 5 is a plane view showing a rectangular barrel member.

As shown in FIGS. 3–5, the rectangular barrel member 8 is made of a thin metal material and composed of a square bottom portion 81 and four resilient plate segments 82 bent from each sides of the square bottom portion 81 to form a rectangular box shape. The square bottom portion 81 is faced to the end face of the first shaft portion 71 and the bottom face of the first groove 22 or to the end face of the second shaft portion 72 and the bottom face of the second groove 35. Each segment 82 is interposed between a flat surface 71a of the first shaft portion 71 and a flat surface 22a of the first groove 22, or between a flat surface 72a of the second shaft portion 72 and a flat surface 35a of the second groove 35. Each segment 82 has at least one corrugated, depressed or dent portion 82a which is brought into resilient contact with the flat surface 71a or 72a of the shaft portion 71 or 72 when the barrel member 8 is inserted into the groove 22 or 35 so that a gap or play between each segment 82 and the confronting surface 22a or 35a of the groove 22 or 35 is absorbed and each segment 82 comes into close contact therewith.

When the coupling member 7 is to be fitted with the shafts 21, 34, the resilient barrel members 8 are first inserted into the first and second grooves 22, 35, respectively and after that the shaft portions 71, 72 of the coupling member or torque cable 7 are inserted into the barrel members 8, respectively. At this time, each corrugated portion 82a of each segment 82 is brought into contact with each mating face 71a or 72a of the shaft portion 71 or 72 and each segment 82 is deformed outwardly so that the remaining flat surface of the segment 82 is made contact with the mating flat surface 22a or 35a of the groove 22 or 35. Thus, the chattering of the torque cable 7 in the grooves 22, 35 is prevented and the slipping-off of the torque cable 7 from the grooves 22, 35 is also prevented.

It is noted that the configurations of the grooves 22, 35 and the shaft portions 71, 72 are not limited to rectangular or square configurations. Polygonal configuration such as triangular or pentagonal shape may be applied to the grooves 22, 35 and the shaft portions 71, 72. In this case, the configurations of the barrel member 8 is adjusted to mate with the configurations of the grooves 22, 35 and the shaft portions 71, 72.

As many apparently widely different embodiments of the present invention can be made without departing from the spirit and scope thereof, it is to be understood that the invention is not limited to the specific embodiments thereof except as defined in the appended claims.

The above-mentioned drive apparatus 1 is incorporated into the mechanism for sliding the seat forwardly or rearwardly. However, it may be incorporated in a vertical mechanism for vertically moving the seat cushion 41 or a reclining mechanism 31 for tilting a seat back 42 with respect to the seat cushion 41 as shown in FIG. 1.

What is claimed is:

1. A drive apparatus, comprising:
   an electric motor for displacing a driven member;
   a reduction gear means for transmitting rotational torque from the motor to the driven member;
   a resilient coupling member having polygonal end portions for connecting an output shaft of the motor to an input shaft of the reduction gear means, the input shaft being provided at an end portion with a polygonal groove which is open to an end face thereof and the output shaft being provided at an end portion with a polygonal groove which is open to an end face thereof, said polygonal end portions of the resilient coupling member being inserted in each of said grooves, respectively; and
   polygonal barrel members interposed between each end portion of the coupling member and each of said grooves, respectively, each of said polygonal barrel members being made of a thin metal material having a bottom wall and at least one segment extending perpendicular thereto, said at least one segment having at least one deformable portion for aligning an axis of the coupling member with respective axes of said input and output shafts.

2. A power seat for an automotive vehicle having improved drive means, said improved drive means comprising:
   a lower rail securable to a vehicle's floor;
   an upper rail slidable with respect to the lower rail;
   a screw shaft supported on the upper rail;
   a nut connected to the lower rail and engaged with the screw shaft to allow a rotation of the screw shaft;
   an electric motor supported on a side of the upper rail;
   a speed reducer connected to the screw shaft;
   a coupling member connecting the motor and the speed reducer together to allow rotational torque to be transmitted from the motor to the speed reducer; and
   at least one barrel member having a polygonal cross section disposed on an end portion of the coupling member and engaging a groove having a complementary shape formed in an input shaft of the speed reducer or the output shaft of the motor, the barrel member being made of a thin metal material and having a polygonal shape including a bottom wall and at least one segment extending perpendicular thereto with at least one deformed portion which is deformably contacted with the one end portion of the coupling member and the groove formed in the input shaft or the output shaft for aligning an axis of the coupling member with an axis of the input shaft or the output shaft.

3. A drive apparatus, comprising:

an electric motor for displacing a driven member;

a reduction gear means for transmitting rotational torque from the motor to the driven member;

a resilient coupling member having polygonal end portions for connecting an output shaft of the motor to an input shaft of the reduction gear means, the input shaft being provided at an end portion with a polygonal groove which is open to an end face thereof and the output shaft being provided at an end portion with a polygonal groove which is open to an end face thereof, said polygonal end portions of the resilient coupling member being inserted in each of said grooves, respectively; and polygonal barrel members interposed between each end portion of the coupling member and each of said grooves, respectively, each of said polygonal barrel members being made of a thin metal material having deformable portions for aligning an axis of the coupling member with respective axes of said input and output shafts, wherein the barrel members each has a square or rectangular cross section and said deformable portions are comprised of four segments extending from a bottom wall, each segment being in abutment contact with a corresponding end portion of the coupling member.

4. The drive apparatus according to claim 3, wherein each deformable portion is comprised of a dent shape formed on each of the segments.

5. A power seat for an automotive vehicle having improved drive means, said improved drive means comprising:

a lower rail securable to a vehicle's floor;

an upper rail slidable with respect to the lower rail;

a screw shaft supported on the upper rail;

a nut connected to the lower rail and engaged with the screw shaft to allow a rotation of the screw shaft;

an electric motor supported on a side of the upper rail;

a speed reducer connected to the screw shaft;

a coupling member connecting the motor and the speed reducer together to allow rotational torque to be transmitted from the motor to the speed reducer; and at least one barrel member having a polygonal cross section disposed on an end portion of the coupling member and engaging a groove having a complementary shape formed in an input shaft of the speed reducer or the output shaft of the motor, the barrel member being made of a thin metal material and having a polygonal shape with at least one deformed portion which is deformably contacted with the one end portion of the coupling member and the groove formed in the input shaft or the output shaft for aligning an axis of the coupling member with an axis of the input shaft or the output shaft, wherein the barrel member has a square or rectangular cross section and is comprised of four plate segments extending from a bottom portion, each segment having a deformed portion.

* * * * *